(12) United States Patent
Bonso

(10) Patent No.: US 8,470,249 B2
(45) Date of Patent: Jun. 25, 2013

(54) APPARATUS FOR MAKING GASEOUS CLATHRATE

(75) Inventor: Bernd Bonso, Berlin (DE)

(73) Assignee: Reto Mebes, Hombrechtikon (CH)

( * ) Notice: Subject to any disclaimer, the term of this patent is extended or adjusted under 35 U.S.C. 154(b) by 118 days.

(21) Appl. No.: 13/244,409

(22) Filed: Sep. 24, 2011

(65) Prior Publication Data

US 2012/0076706 A1 Mar. 29, 2012

(30) Foreign Application Priority Data

Sep. 28, 2010 (DE) .......................... 10 2010 037 823

(51) Int. Cl.
*B01J 10/00* (2006.01)
*C07C 9/00* (2006.01)

(52) U.S. Cl.
USPC ........... 422/129; 422/162; 422/243; 422/198; 585/15; 585/921; 585/922; 222/566; 222/575

(58) Field of Classification Search
USPC ..................... 422/129, 162, 198, 243; 585/15, 585/921, 922; 222/566, 575
See application file for complete search history.

(56) References Cited

U.S. PATENT DOCUMENTS

| 7,863,491 | B1 * | 1/2011 | Bonso | 585/15 |
| 8,153,075 | B2 * | 4/2012 | Nagamori et al. | 422/201 |

* cited by examiner

*Primary Examiner* — Jill Warden
*Assistant Examiner* — Lessanework Seifu
(74) *Attorney, Agent, or Firm* — Andrew Wilford

(57) ABSTRACT

An apparatus for making a gaseous clathrate has a closed reaction vessel to which are fed a reaction gas and a reaction liquid while an interior of the vessel is maintained at a predetermined pressure and a predetermined temperature so that the gaseous clathrate is formed in the vessel. An outlet nozzle on the vessel defines a flow passage opening into the vessel and having an inner wall surface extending between an inner inlet end inside the vessel and an outer outlet end. The passage extends along an axis, is rotation-symmetrical about the axis, and is of decreasing flow cross section from its inner end to its outer end. The inner wall surface is curved in an S-shape from the inner end to the outer end so that pressure in the vessel forces the formed clathrate out through the passage with increasing compression as the flow cross section decreases.

13 Claims, 3 Drawing Sheets

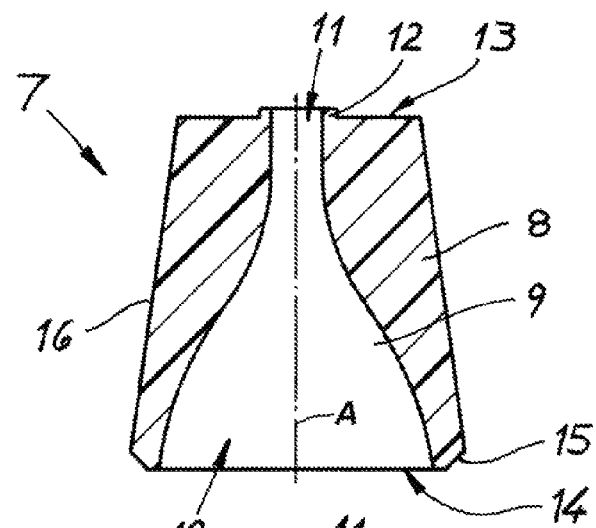
_Fig.2_
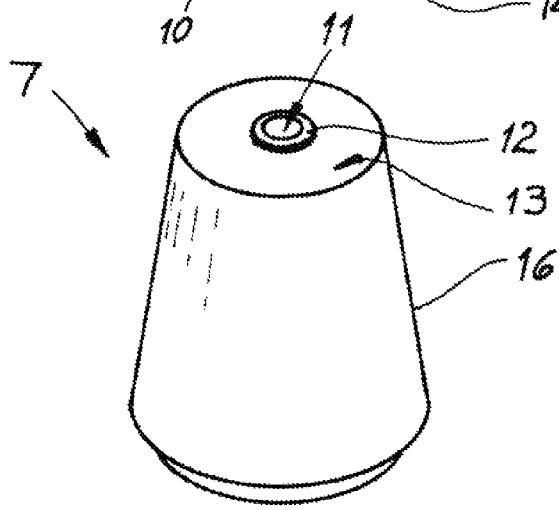
_Fig.3_
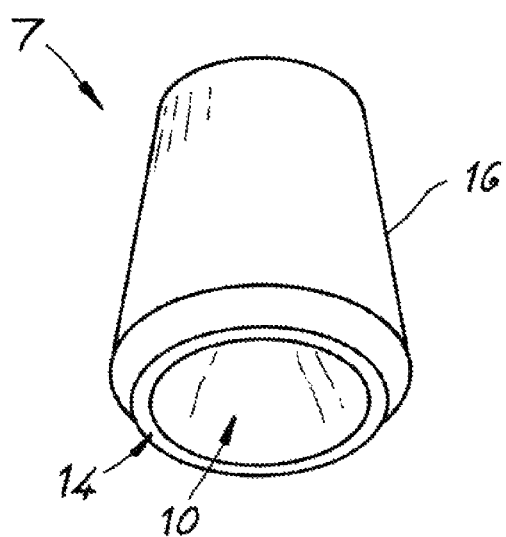
_Fig.4_

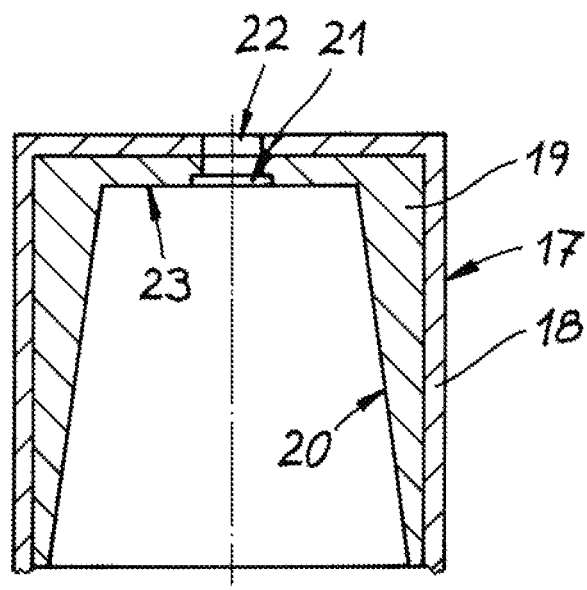
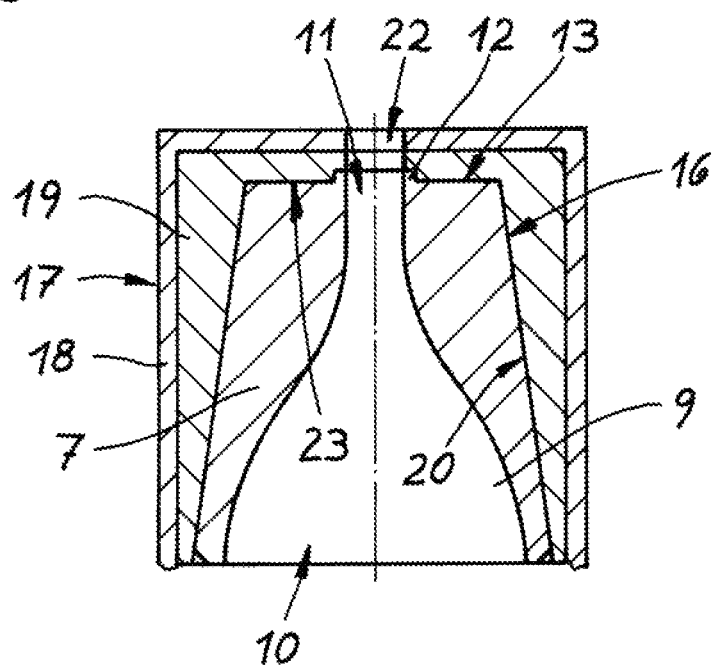

APPARATUS FOR MAKING GASEOUS CLATHRATE

FIELD OF THE INVENTION

The present invention relates to an apparatus for making a gaseous clathrate.

BACKGROUND OF THE INVENTION

A standard such apparatus has a reaction vessel, at least one reaction gas supply and at least one reaction liquid supply. It is possible, for example, to employ such an to produce methane hydrate or methane clathrate. To this end, methane gas and water are introduced into a reactor or into a reactor vessel at pressures of typically more than 60 bar and temperatures around 0° C. Under the above-referenced reaction conditions, a gas-inclusion compound is formed in which methane gas is contained in cavities of ice crystals. This prior-art apparatus is used in a discontinuous operation, with the result that the production of methane hydrate is done in batches. As a result, the production of larger quantities of gaseous clathrate is very expensive, inefficient from an energy point of view, and thus uneconomical when using the prior-art apparatuses.

OBJECTS OF THE INVENTION

It is therefore an object of the present invention to provide an improved apparatus for making gaseous clathrate.

Another object is the provision of such an improved apparatus for making gaseous clathrate that overcomes the above-given disadvantages, in particular that is distinguished by high energy efficiency, simplicity of operation or manipulation, and high cost-efficiency.

SUMMARY OF THE INVENTION

An apparatus for making a gaseous clathrate has according to the invention a substantially closed reaction vessel to which are fed a reaction gas and a reaction liquid while an interior of the vessel is maintained at a predetermined pressure and a predetermined temperature so that the gaseous clathrate is formed in the vessel. An outlet nozzle on the vessel defines a flow passage opening into the vessel and having an inner wall surface extending between an inner inlet end inside the vessel and an outer outlet end. The passage extends along an axis, is rotation-symmetrical about the axis, and is of decreasing flow cross section from its inner end to its outer end. The inner wall surface is curved in an S-shape from the inner end to the outer end so that pressure in the vessel forces the formed clathrate out through the passage with increasing compression as the flow cross section decreases.

The apparatus according to the invention enables gaseous clathrates to be produced under standard conditions known per se. The conditions required for this purpose are established using the pressure regulator and temperature controller according to the invention. By way of example, hydrocarbon-containing gases (for example, methane, natural gases or natural gas) or hydrogen can be used as the reaction gas. It is recommended that an aqueous solution and/or an organic solvent be used as the reaction liquid. In order to enable the effective formation of clathrates, the density and/or adsorptive capacity and/or absorptive capacity of the reaction liquid are advantageously modified through the addition of salts.

According to the invention the specific density of the formed clathrate is lower than the specific density of the reaction liquid. The formed gaseous clathrate advantageously floats on the reaction liquid and has a snow-like or slush-like consistency. Due to the preferably continuous formation of the gaseous clathrate in the reaction vessel, the volume of the gaseous clathrate located in the reaction vessel increases at a constant rate, thereby enabling the gaseous clathrate floating on the reaction liquid to be advantageously forced upward into the outlet fitting at the top of the vessel and into the flow passage of the outlet nozzle. It has been found advantageous to provide an additional temperature controller in the outlet fitting.

The additional temperature controller enables the temperature of the gaseous clathrate or of a gaseous clathrate droplet in the outlet fitting to be adjusted so as to ensure that a gaseous clathrate layer is melted at the interface between the gaseous clathrate droplet and a wall of the outlet fitting in response to the pressure exerted at the reaction vessel side on the gaseous clathrate droplets. As a result, a lubricating film or a friction-reducing liquid film is advantageously created, thereby enabling the gaseous clathrate droplet to be advanced toward the outlet orifice of the outlet nozzle.

The inventive design of the flow passage ensures within the scope of the invention that a precisely controllable pressing out of the gaseous clathrate is effected from the outlet orifice. By modifying or reducing the cross-section of the flow passage of the outlet nozzle, the pressure acting on the gaseous clathrate is advantageously increased, with the result that the gaseous clathrate is advantageously compressed and excess reaction liquid is preferably removed from the gaseous clathrate. A liquid film is advantageously generated between the flow-passage wall and the gaseous clathrate in response to the pressure acting on the gaseous clathrate. It is recommended that the gaseous clathrate pressed from the outlet orifice be able to be transferred, for example, to a tank by a transport line.

In one embodiment of the invention, the flow passage has a flow resistance for the gaseous clathrate that is adjusted so as to ensure that the gaseous clathrate is pressed or can be pressed by a reactor pressure out through the outlet nozzle, the reactor pressure being built up by the preferably continuous formation of the gaseous clathrate in the reaction vessel and/or in the reaction gas and/or reaction liquid delivered to the reaction vessel. An approach has been found advantageous whereby the reaction gas and the reaction liquid are able to be fed by the reaction gas supply and reaction liquid supply to the reaction vessel so as to ensure that the reactor pressure or working pressure in the reaction vessel is held constant or essentially constant. In an especially preferred embodiment, the reaction gas supply and the reaction liquid supply of the apparatus according to the invention are controllable in such a way that a volume of the gaseous clathrate pressed out through the outlet orifice is replaced by additional reaction gas introduced into the reaction vessel and preferably injected reaction liquid. Thus the system has a steady-state continuous reaction, with incoming reaction liquid and gas keeping the pressure up as the finished clathrate exits at the top.

It is recommended that the flow-passage wall be made of plastic, and preferably of polytetrafluoroethylene or a polyamide. The flow-passage wall is preferably lined so as to ensure that the formed gaseous clathrate advantageously cannot adhere to the flow-passage wall.

In a preferred embodiment, the S-shaped curve of the flow-passage wall has an inflection point that is preferably located in the first half in the longitudinal direction of the flow passage. In the context of the invention, the longitudinal direction of the flow passage refers to the center of the flow passage from the inlet orifice to the outlet orifice. Especially preferably, the inflection point is in a region that comprises approximately 30% of the length of the flow passage and extends from the center of the flow passage toward the inlet orifice. What is determined by the inventive S-curve-shaped design of the flow-passage wall together with the inventive continuous tapering of the flow passage is that the cross-section of the inlet orifice is larger than the cross-section of the outlet orifice.

It is recommended that the ratio of the diameter of the inlet orifice to the diameter of the outlet orifice be 10:0.2, preferably 9:0.5, and especially preferably, 8:0.7. In another embodiment, the ratio of the diameter of the inlet orifice to the diameter of the outlet orifice measures 7:1, or approximately 7:1.

In an especially preferred embodiment, the contour of the flow-passage wall is determined by a tangent curve.

In one embodiment, the outlet nozzle has a frustoconical side surface and a flat end face, the outlet orifice being disposed in the end face. Especially preferably, the outlet nozzle is accommodated in a sealing sleeve, the sealing sleeve being connected to the outlet fitting in a fluid-tight manner. In principle it is possible for the sealing sleeve to provide a flange connection to other elements of the apparatus, such as for example the transport lines, tank, and the like. The sealing sleeve is advantageously made of a natural-gas-resistant and salt-water-resistant material, preferably, steel.

In a preferred embodiment, the sealing sleeve has a frustoconical sealing surface on which the frustoconical side surface of the outlet nozzle fits, where the end face of the outlet nozzle rests on an annular sealing face of the sealing sleeve and where the outlet orifice is disposed so as to be fit in an opening in the annular sealing face. The frustoconical side surface or end face of the outlet nozzle advantageously fits in a fluid-tight manner on the complementary frustoconical sealing surface or annular sealing face of the sealing sleeve when reaction conditions are present in the reaction vessel so as to ensure that gaseous clathrate is formed. It is within the scope of the invention for the gaseous clathrate formed in the reaction vessel to be forced by gas pressure out of the reaction vessel into the outlet fitting, and from there through the inlet orifice into the flow passage of the outlet nozzle, and through the outlet orifice of the outlet nozzle and the opening of the sealing sleeve.

In an advantageous embodiment, the frustoconical sealing surface of the sealing sleeve has a coating or a liner that fits on the side surface of the outlet nozzle in a fluid-tight manner. The liner of the sealing sleeve is advantageously elastically deformable and is preferably made of plastic, preferably polytetrafluoroethylene. It has been found advantageous if the liner is deformable as a function of pressure, thereby ensuring a fluid-tight fit of the outlet nozzle against the sealing sleeve. In an especially preferred embodiment, the liner is attached to the sealing sleeve in a fluid-tight manner.

It is possible for the connector nozzle to be made essentially out of at least one plastic, preferably of polytetrafluoroethylene and/or a polyamide. In one embodiment, the connector nozzle body is provided with a coating that forms the side surface and that is designed to provide a fluid-tight fit against the sealing surface of the sealing sleeve. It is recommended that an internal coating be provided in the connector nozzle body to provide the flow-passage wall. It is possible to produce the assembly composed of connector nozzle body, coating, and internal coating from the same material. In another embodiment, the connector nozzle body, coating, and internal coating are produced from different materials. The internal coating and/or the coating are preferably made of polytetrafluoroethylene and/or polyamide.

The invention is based on the discovery that the apparatus according to the invention can be used to produce gaseous clathrates with high functional reliability in a continuous process. The apparatus according to the invention is distinguished here by excellent energy efficiency. The essential aspect of the apparatus according to the invention is the outlet nozzle that ensures a noncritically controllable and regulatable output of the gaseous clathrate produced in the reaction vessel due to its inventive design. The invention furthermore has the advantage that the use of a wear-prone seal, which must be usable over a wide pressure and temperature range, is eliminated in a surprisingly simple manner. The result is that the apparatus according to the invention is distinguished by a very simple construction, trouble-free operation, and high functional reliability. In particular, the output of the produced gaseous clathrate from the reaction vessel is noncritical due to the inventive design of the outlet fitting together with the outlet nozzle connected thereto. As a result, the apparatus according to the invention has significant advantages over the prior art.

BRIEF DESCRIPTION OF THE DRAWING

The above and other objects, features, and advantages will become more readily apparent from the following description, reference being made to the accompanying drawing in which:

FIG. 2 is a section through an outlet nozzle according to the invention;

FIGS. 3 and 4 are perspective views from above and below of the outlet nozzle according to the invention;

FIG. 5 is a section through a sealing sleeve according to the invention; and

FIG. 6 a section through a sealing sleeve according to the invention in which an outlet nozzle is installed.

DETAILED DESCRIPTION

Figure 1:
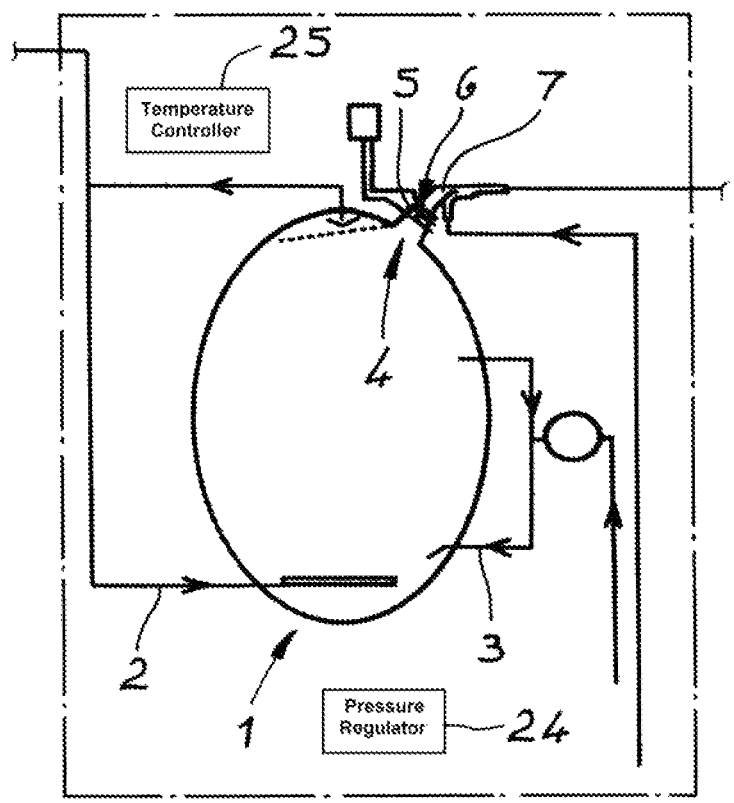
FIG. 1 is a schematic view of an apparatus according to the invention for carrying out a continuous process for making gaseous clathrates.

As seen in FIG. 1 a schematically illustrated reaction vessel 1 is fed a condensed or compressed reaction gas from a reaction gas supply 2. A reaction liquid is introduced from a reaction liquid supply 3 into the reaction vessel 1. Reaction pressure and temperature in the reaction vessel 1 are adjusted so as to ensure that the reaction liquid and reaction gas form a gaseous clathrate. A pressure regulator 24 and temperature controller 25 are also shown schematically in FIG. 1.

The specific density of the formed gaseous clathrate is lower than the density of the reaction liquid so that the gaseous clathrate that is formed floats on the reaction liquid. Preferably and as shown in FIG. 1, the reaction gas and reaction liquid entering the reaction vessel 1 are controlled by the reaction gas supply 2 and the reaction liquid supply 3 so as to maintain the reaction conditions. Due to the continuous increase in volume on the part of the formed gaseous clathrate, the gaseous clathrate continuously formed in the reaction vessel 1 is forced through an outlet fitting 4 in the upper region of the vessel 1. FIG. 1 shows that an additional temperature controller 5 is provided in the outlet fitting 4 to adjust the temperature for the gaseous clathrate droplet 6 at this location.

Preferably and in the embodiment of FIG. 1, an outlet nozzle 7 is connected to the outlet fitting 4, and the gaseous clathrate droplets 6 that are temperature-controlled by the temperature controller 5 are forced up and out through nozzle 7 by the pressure created in the vessel 1 by the reaction therein.

As better shown in FIGS. 2-4, the outlet nozzle 7 has a body 8 forming a flow passage 9 centered on an axis A. FIGS. 2 and 4 show that the flow passage 9 has a rotationally symmetrical shape. Its inlet orifice or end 10 and its outlet orifice or end 11 are thus each of circular shape. Preferably and in the embodiment of FIG. 2, the ratio of the diameter of the inlet orifice 10 to the diameter of the outlet orifice 11 is 7:1.

FIGS. 2 and 6 also show that the flow passage 9 is shaped as an S curve. The flow passage 9 of the outlet nozzle 7 here tapers down continuously from the inlet orifice 10 to the outlet orifice 11. In the embodiment of FIG. 2, the outlet orifice 11 is surrounded by an annular raised area or ridge 12 that projects beyond the planar sealing end face 13 of the outlet nozzle 7. Preferably and in FIGS. 2 through 4, an inlet-orifice-side end face 14 of the outlet nozzle 7 has a chamfer 15 around its outer periphery. FIGS. 2 through 4 furthermore show that a side surface 16 of the outlet nozzle 7 has a frustoconical shape centered on the axis A. Preferably and in the embodiment of FIGS. 2 through 4, the nozzle body 8 is made of polytetrafluoroethylene.

FIG. 5 shows a sealing sleeve 17 that is connected to the outlet fitting 4 of the reaction vessel 1 in a fluid-tight manner. FIG. 5 furthermore shows that the sealing sleeve 17 has a body 18 to which a liner 19 is attached inside the sealing sleeve 17. The liner 19 is designed in such a way that the outer side surface 16 fits in a fluid-tight manner against an inside sealing surface 20 of the liner 19 when the assembly formed by the sealing sleeve 17 and the outlet nozzle 7 of FIG. 6 are fitted together. FIGS. 2 and 5 show that the side surface 16 and the sealing surface 20 are of complementary frustoconical shape. FIG. 6 shows that the ridge 12 that runs around the outlet orifice 11 of the outlet nozzle 7 fits within an opening 21 of the liner 19, which opening 21 is oriented to be aligned with a discharge orifice 22 in the sleeve body 18. Preferably and in the embodiment of FIG. 6, the flat end face 13 fits in a fluid-tight manner against a complementary annular face 23 of the liner 19 when the outlet nozzle 7 is inserted in the sealing sleeve 17.

I claim:

1. An apparatus for making a gaseous clathrate, the apparatus comprising:
    a substantially closed reaction vessel;
    means for feeding a reaction gas and a reaction liquid into the vessel;
    means for maintaining an interior of the vessel at a predetermined pressure and a predetermined temperature, whereby the gaseous clathrate is formed in the vessel; and
    an outlet nozzle on the vessel defining a flow passage opening into the vessel and having an inner wall surface extending between an inner inlet end inside the vessel and an outer outlet end, the passage extending along an axis, being rotation-symmetrical about the axis, and being of decreasing flow cross section from the inner end to the outer end, the inner wall surface being curved in an S-shape from the inner end to the outer end, whereby pressure in the vessel forces the formed clathrate out through the passage with increasing compression as the flow cross section decreases.

2. The apparatus defined in claim 1, wherein the shape of the passage is such that the nozzle has a for the gaseous clathrate a flow resistance that ensures that the gaseous clathrate is forced out through the outlet nozzle by pressure that is built up in the reactor by the continuous formation of the gaseous clathrate in the reaction vessel, or by the reaction gas or liquid fed into the reaction vessel.

3. The apparatus defined in claim 1, wherein the inner wall surface of the nozzle is formed by plastic.

4. The apparatus defined in claim 3, wherein the plastic is polytetrafluoroethylene.

5. The apparatus defined in claim 3 wherein the plastic is a polyamide.

6. The apparatus defined in claim 1, wherein the S-shaped inner wall surface has an inflection point that is closer to the inner end than to the outer end.

7. The apparatus defined in claim 6, wherein the inner wall surface is defined by a tangent curve.

8. The apparatus defined in claim 1, wherein the nozzle has a frustoconical outer surface centered on the axis and a planar end face perpendicular to the face and forming the outer passage end.

9. The apparatus defined in claim 8 wherein the nozzle includes a rigid outer sleeve with a frustoconical inner surface and end face fitting complementarily with the outer surface and end face of the nozzle.

10. The apparatus defined in claim 9 wherein the outer sleeve has an end wall forming the respective end face and formed with a central throughgoing hole, the end face of the nozzle being formed around the passage outer end with an outwardly projecting ridge fitting complementarily in the hole.

11. The apparatus defined in claim 10, wherein the ridge is annular, surrounds the passage, and fits into the outer sleeve at the outer nozzle end.

12. The apparatus defined in claim 8, wherein the outer sleeve is formed by a basically cylindrical outer part and an inner liner of plastic forming the respective inner surface.

13. The apparatus defined in claim 12, wherein the outer part is of metal.

* * * * *